United States Patent
Hu et al.

(10) Patent No.: US 11,093,531 B2
(45) Date of Patent: Aug. 17, 2021

(54) SYSTEMS AND METHODS FOR RECALLING POINTS OF INTEREST USING A TAGGING MODEL

(71) Applicant: BEIJING DIDI INFINITY TECHNOLOGY AND DEVELOPMENT CO., LTD., Beijing (CN)

(72) Inventors: Juan Hu, Beijing (CN); Huan Chen, Beijing (CN); Qi Song, Beijing (CN); Li Ma, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/192,912

(22) Filed: Mar. 5, 2021

(65) Prior Publication Data
US 2021/0209137 A1    Jul. 8, 2021

Related U.S. Application Data

(63) Continuation of application No. PCT/CN2018/112895, filed on Oct. 31, 2018.

(30) Foreign Application Priority Data
Oct. 25, 2018 (CN) .......................... 201811249879.8

(51) Int. Cl.
*G06F 16/29* (2019.01)
*G06F 16/242* (2019.01)
(Continued)

(52) U.S. Cl.
CPC .......... *G06F 16/29* (2019.01); *G06F 16/2425* (2019.01); *G06K 9/6259* (2013.01); *G06N 3/049* (2013.01)

(58) Field of Classification Search
CPC ... G06F 16/29; G06F 16/2425; G06K 9/6259; G06N 3/049
(Continued)

(56) References Cited

U.S. PATENT DOCUMENTS 8,073,845 B2    12/2011   Homma et al.
2010/0094835 A1*  4/2010   Lu .................. G06F 16/3338
                                                  707/705
(Continued)

FOREIGN PATENT DOCUMENTS

CN    104615589 A    5/2015
CN    106682192 A    5/2017
(Continued)

OTHER PUBLICATIONS

International Search Report in PCT/CN2018/112895 dated Jul. 8, 2019, 4 pages.
(Continued)

*Primary Examiner* — Hares Jami
(74) *Attorney, Agent, or Firm* — Metis IP LLC

(57) ABSTRACT

The present disclosure relates to systems and methods for recalling one or more POIs. The systems and methods may receive a query inputted by a user via a terminal and determine one or more terms by processing the received query. The systems and methods may further label the one or more terms using a trained tagging model. The systems and methods may determine one or more POs based on the labeled one or more terms, and display the one or more terms on the terminal.

15 Claims, 8 Drawing Sheets

(51) Int. Cl.
*G06K 9/62* (2006.01)
*G06N 3/04* (2006.01)

(58) Field of Classification Search
USPC .......................................................... 707/724
See application file for complete search history.

(56) References Cited

U.S. PATENT DOCUMENTS

| | | | | |
|---|---|---|---|---|
| 2012/0117007 | A1* | 5/2012 | Agrawal | G06F 16/29 |
| | | | | 706/12 |
| 2013/0110823 | A1* | 5/2013 | Su | G06F 16/9535 |
| | | | | 707/723 |
| 2014/0330865 | A1* | 11/2014 | Xue | G06F 16/29 |
| | | | | 707/769 |
| 2018/0231391 | A1* | 8/2018 | Yang | G06N 5/02 |
| 2019/0362266 | A1* | 11/2019 | Dai | G06F 16/3329 |

FOREIGN PATENT DOCUMENTS

| | | |
|---|---|---|
| CN | 107818130 A | 3/2018 |
| CN | 107908614 A | 4/2018 |
| CN | 108121736 A | 6/2018 |
| CN | 108334617 A | 7/2018 |

OTHER PUBLICATIONS

Written Opinion in PCT/CN2018/112895 dated Jul. 8, 2019, 5 pages.
Zhang, Miaomiao et al., The Integration of Gated Filtering Mechanism and Deep Bi-LSTM-CRF for Chinese Semantic Role Labeling, Technology Intelligence Engineering, 4(2): 45-53, 2018.
"BiLSTM-CRF Model Realizes Chinese Named Entity Recognition", Web page <https://blog.csdn.net/liangjiubujiu/article/details/79674606>, Mar. 24, 2018.
Guillaume Lample et al., Neural Architectures for Named Entity Recognition, Proceedings of NAACL-HLT 2016, 2016, 11 pages.

* cited by examiner

SYSTEMS AND METHODS FOR RECALLING POINTS OF INTEREST USING A TAGGING MODEL

CROSS-REFERENCE TO RELATED APPLICATIONS

This application is a continuation of International Patent Application No. PCT/CN2018/112895, filed on Oct. 31, 2018, which claims priority to Chinese Application No. 201811249879.8, filed on Oct. 25, 2018, the contents of each of which are hereby incorporated by reference.

TECHNICAL FIELD

The present disclosure generally relates to systems and methods for online to offline (O2O) service, and in particular, systems and methods for recalling points of interest (POIs) using a tagging model.

BACKGROUND

Online to offline (O2O) services, such as online taxi-hailing services, have been widely used in daily lives because of their convenience. For an online taxi-hailing service, a user may input a query associated with a pickup location and/or a destination. An online taxi-hailing service system may perform a search in a map database according to the inputted query. However, if the query inputted by the user includes information irrelevant to the pickup location and/or the destination, the query cannot recall any POI and may need to be modified by the user. In some cases, the user may need to repeatedly modify the query until one or more POIs are recalled, which may be time consuming. Thus, it is desirable to provide a system and method for automatically recalling POIs when the query includes irrelevant information.

SUMMARY

In one aspect of the present disclosure, a system for training a tagging model is provided. The system may include at least one storage device and at least one processor in communication with the at least one storage device. The storage device may include a set of instructions for determining a trained tagging model for labeling a query. When executing the set of instructions, the at least one processor may be directed to obtain a plurality of training samples. The plurality of training samples may correspond to a plurality of historical queries. Each of the plurality of historical queries may include one or more terms and one or more labels corresponding to the one or more terms. The at least one processor may be further directed to generate a trained tagging model by training a preliminary tagging model using the plurality of training samples. The preliminary tagging model may include one or more feature layers configured to extract a feature vector for each term of the one or more terms.

In some embodiments, each of the one or more terms may be labeled with a first label or a second label.

In some embodiments, the historical query may not recall a point of interest (POI). The historical query may be inputted by a user. The at least one processor may be further directed to obtain a modified historical query that recalls one or more POIs. The modified historical query may be determined by the user via deleting at least one term in the historical query and may include one or more remaining terms. The at least one processor may be further directed to label the deleted at least one term with a first label and the one or more remaining terms with a second label, and determine the one or more labeled terms as a training sample of the plurality of training samples.

In some embodiments, the at least one processor may be further directed to perform a word segmentation on the historical query to determine the one or more terms.

In some embodiments, each of the one or more feature layers may correspond to a feature attribute. The feature attribute may have a weight.

In some embodiments, the feature attribute may include at least one of a location attribute and a city attribute.

In some embodiments, the trained tagging model may include a word embedding layer configured to determine a word embedding vector for the each term. The at least one processor may be further directed to combine the feature vector of the each term and the word embedding vector of the each term to determine a combined vector of the each term.

In some embodiments, the preliminary tagging model may be based on at least one of a Bi_LSTM_CRF model, a LSTM_CRF model, a LSTM model, or a CRF model.

In another aspect of the present disclosure, a method for training a tagging model may be provided. The method may be implemented on a computing device. The computing device may have at least one processor, at least one computer-readable storage medium, and a communication platform connected to a network. The method may include obtaining a plurality of training samples. The plurality of training samples may correspond to a plurality of historical queries. Each of the plurality of historical queries may include one or more terms and one or more labels corresponding to the one or more terms. The method may also include generating a trained tagging model by training a preliminary tagging model using the plurality of training samples. The preliminary tagging model may include one or more feature layers configured to extract a feature vector for each term of the one or more terms.

In some embodiments, each of the one or more terms may be labeled with a first label or a second label.

In some embodiments, the historical query may not recall a point of interest (POI). The historical query may be inputted by a user. The method may include obtaining a modified historical query that recalls one or more POIs. The modified historical query may be determined by the user via deleting at least one term in the historical query and may include one or more remaining terms. The method may also include labeling the deleted at least one term with a first label and the one or more remaining terms with a second label, and determining the one or more labeled terms as a training sample of the plurality of training samples.

In some embodiments, the method may further include performing a word segmentation on the historical query to determine the one or more terms.

In some embodiments, each of the one or more feature layers may correspond to a feature attribute, the feature attribute having a weight.

In some embodiments, the feature attribute may include at least one of a location attribute and a city attribute.

In some embodiments, the trained tagging model may include a word embedding layer configured to determine a word embedding vector for the each term. The method may further include combining the feature vector of the each term and the word embedding vector of the each term to determine a combined vector of the each term.

In some embodiments, the preliminary tagging model may be based on at least one of a Bi_LSTM_CRF model, a LSTM_CRF model, a LSTM model, or a CRF model.

In another aspect of the present disclosure, a non-transitory computer-readable medium is provided. The non-transitory computer-readable medium may store at least one set of instructions. When executed by at least one processor of a computing device, the at least one set of instructions may direct the at least one processor to perform acts of obtaining a plurality of training samples. The plurality of training samples may correspond to a plurality of historical queries. Each of the plurality of historical queries may include one or more terms and one or more labels corresponding to the one or more terms. The at least one set of instructions may also direct the at least one processor to perform acts of generating a trained tagging model by training a preliminary tagging model using the plurality of training samples. The preliminary tagging model may include one or more feature layers configured to extract a feature vector for each term of the one or more terms.

In another aspect of the present disclosure, a system for training a tagging model is provided. The system may include an obtaining module and a training module. The obtaining module may be configured to obtain a plurality of training samples. The plurality of training samples may correspond to a plurality of historical queries. Each of the plurality of historical queries may include one or more terms and one or more labels corresponding to the one or more terms. The training module may be configured to generate a trained tagging model by training a preliminary tagging model using the plurality of training samples. The preliminary tagging model may include one or more feature layers configured to extract a feature vector for each term of the one or more terms.

In another aspect of the present disclosure, a system for recalling one or more points of interest (POs) is provided. The system may include at least one storage device and at least one processor in communication with the at least one storage device. The system may include a set of instructions. When executing the set of instructions, the at least one processor may be directed to receive a query inputted by a user via a terminal, and determine one or more terms by processing the received query. The at least one processor may also be directed to label the one or more terms using a trained tagging model. The at least one processor may be further directed to determine one or more POs based on the labeled one or more terms, and display the one or more POs on the terminal.

In some embodiments, the query may include text information and/or voice information.

In some embodiments, to determine one or more terms, the at least one processor may be further directed to perform a word segmentation on the received query to determine the one or more terms.

In some embodiments, the trained tagging model may be generated by training a preliminary tagging model using a plurality of training samples. The preliminary trained tagging model may include one or more feature layers configured to extract a feature vector for each of the one or more terms.

In some embodiments, to label the one or more terms using a trained tagging model, the at least one processor may be directed to label each of the one or more terms with a first label or a second label.

In some embodiments, to determine one or more POIs based on the labeled one or more terms, the at least one processor may be directed to retrieve the one or more POIs from a database based on terms of the one or more terms labeled with the second label.

In another aspect of the present disclosure, a method for recalling one or more POIs is provided. The method may be implemented on a computing device. The computing device may have at least one processor, at least one computer-readable storage medium, and a communication platform connected to a network. The method may include receiving a query inputted by a user via a terminal, and determining one or more terms by processing the received query. The method may also include labeling the one or more terms using a trained tagging model. The method may further include determining one or more POIs based on the labeled one or more terms, and displaying the one or more POIs on the terminal.

In some embodiments, the query may include text information and/or voice information.

In some embodiments, determining one or more terms may include performing a word segmentation on the received query to determine the one or more terms.

In some embodiments, the trained tagging model may be generated by training a preliminary tagging model using a plurality of training samples. The preliminary trained tagging model may include one or more feature layers configured to extract a feature vector for each of the one or more terms.

In some embodiments, to label the one or more terms using a trained tagging model, the at least one processor may be directed to label each of the one or more terms with a first label or a second label.

In some embodiments, determining one or more POIs based on the labeled one or more terms may include retrieving the one or more POIs from a database based on terms of the one or more terms labeled with the second label.

In another aspect of the present disclosure, a non-transitory computer-readable medium is provided. The non-transitory computer-readable medium may include at least one set of instructions. When executed by at least one processor of a computing device, the at least one set of instructions may direct the at least one processor to perform acts of receiving a query inputted by a user via a terminal; determining one or more terms by processing the received query; labeling the one or more terms using a trained tagging model; determining one or more POIs based on the labeled one or more terms; and displaying the one or more POIs on the terminal.

In another aspect of the present disclosure, a system for recalling one or more POIs is provided. The system may include a receiving module, a term determination module, a labeling module, a POI determination module, and a display module. The receiving module may be configured to receive a query inputted by a user via a terminal. The term determination module may be configured to determine one or more terms by processing the received query. The labeling module may be configured to label the one or more terms using a trained tagging model. The POI determination module may be configured to determine one or more POIs based on the labeled one or more terms. The display module may be configured to display the one or more POIs on the terminal.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1:
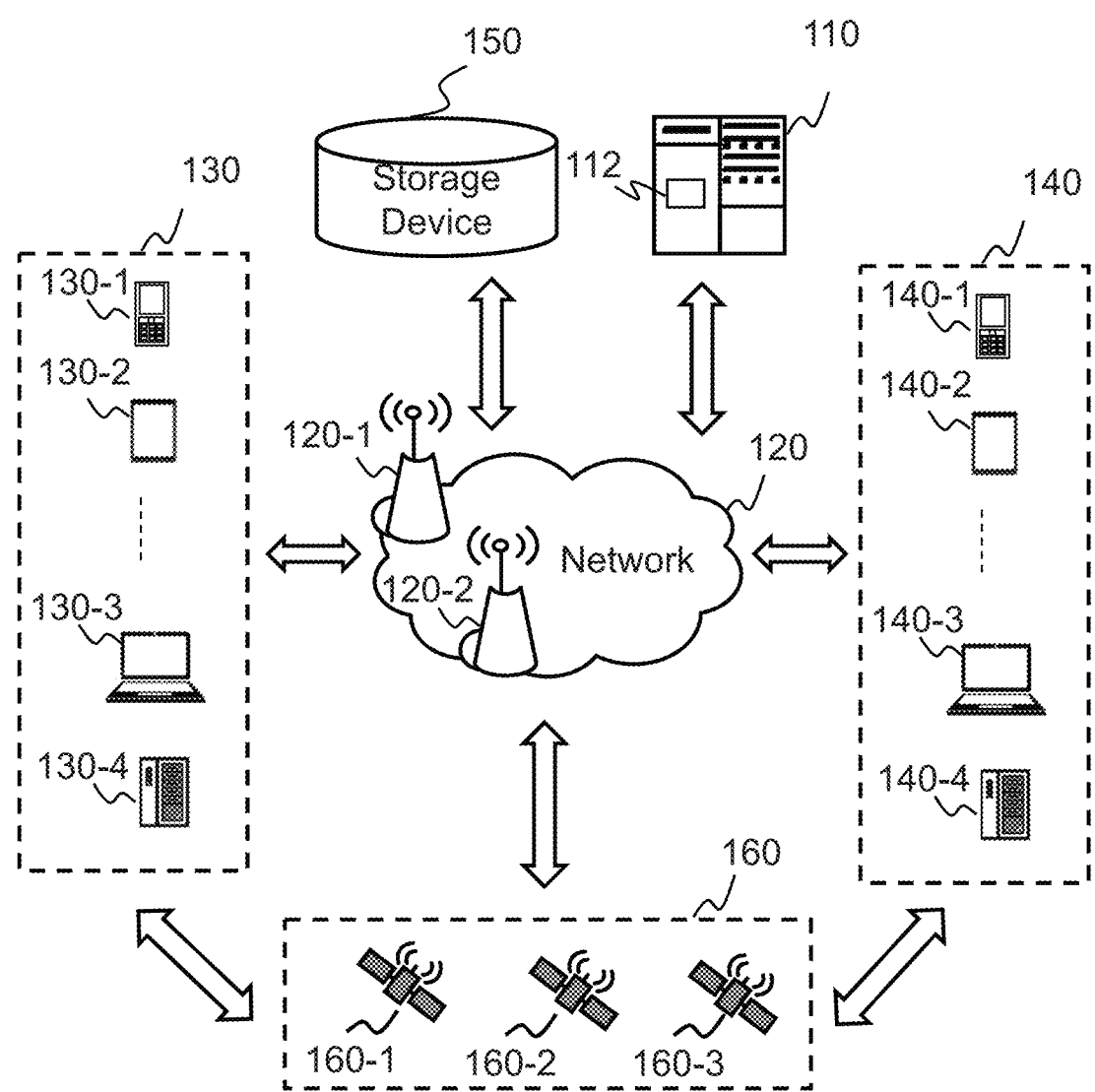
FIG. 1 is a schematic diagram illustrating an exemplary O2O service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding an on-demand transportation service (e.g., O2O service), it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The terms "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The terms "service request" and "order" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

The present disclosure relates to systems and methods for recalling one or more POIs using a trained tagging model. To recall the POI(s), a user may input a query via a terminal. In some embodiments, the inputted query may include irrelevant information that cannot recall the POI(s). The systems and methods may automatically identify the irrelevant information using the trained tagging model and recall the POI(s), and thereby enhance the efficiency of the systems. Specifically, the systems and methods may receive the query inputted by the user via the terminal, and determine one or more terms by processing the received query. The systems and methods may label the one or more terms using the trained tagging model. The systems and methods may determine the POI(s) based on the labeled one or more terms, and further display the POI(s) on the terminal.

The present disclosure also provides systems and methods for training a tagging model. In general, a query may only include few terms, and context information may be unavailable. To enrich feature information of the terms in the query, the tagging model may add one or more feature layers. The feature layer(s) may be configured to extract a feature vector for each term of the query. To train the tagging model, the systems and methods may obtain a plurality of training samples. The training samples may include a plurality of historical queries. Each of the plurality of historical queries may include one or more terms and one or more labels corresponding to the one or more terms. The systems and methods may generate the (trained) tagging model by training a preliminary tagging model using the plurality of training samples.

FIG. 1 is a schematic diagram illustrating an exemplary O2O service system 100 according to some embodiments of the present disclosure. For example, the 020 service system 100 may be an online transportation service platform for transportation services. The O2O service system 100 may include a server 110, a network 120, a requester terminal 130, a provider terminal 140, a storage device 150, and a navigation system 160.

The O2O service system 100 may provide a plurality of services. Exemplary services may include a taxi hailing service, a chauffeur service, an express car service, a carpool service, a bus service, a driver hiring service, and a shuttle service. In some embodiments, the O2O service may be any online service, such as booking a meal, shopping, or the like, or any combination thereof.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage device 150 via the network 120. As another example, the server 110 may be directly connected to the requester terminal 130, the provider terminal 140, and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

Figure 4A:
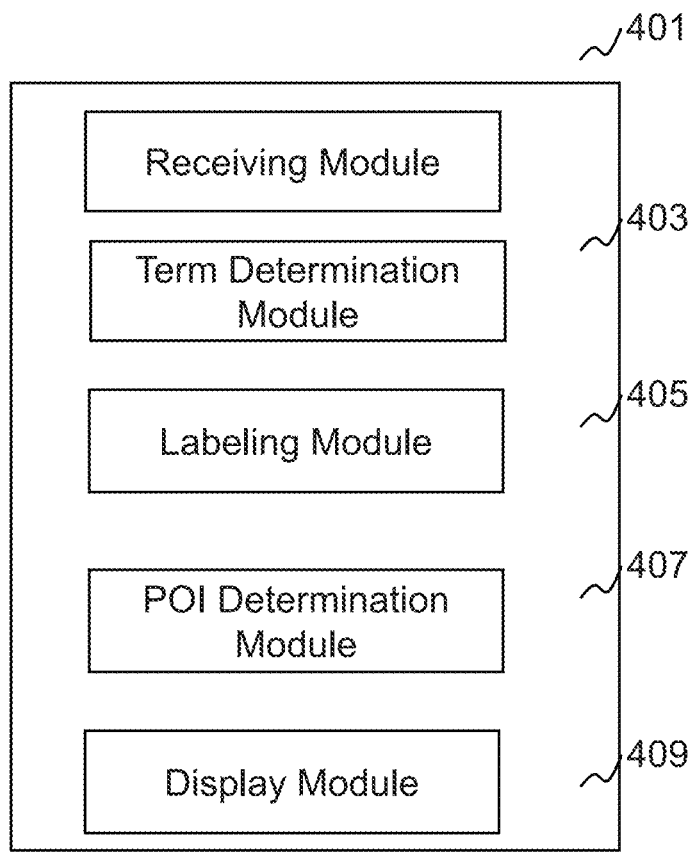
FIGS. 4A and 4B are block diagrams illustrating exemplary processing devices according to some embodiments of the present disclosure.
Figure 4B:
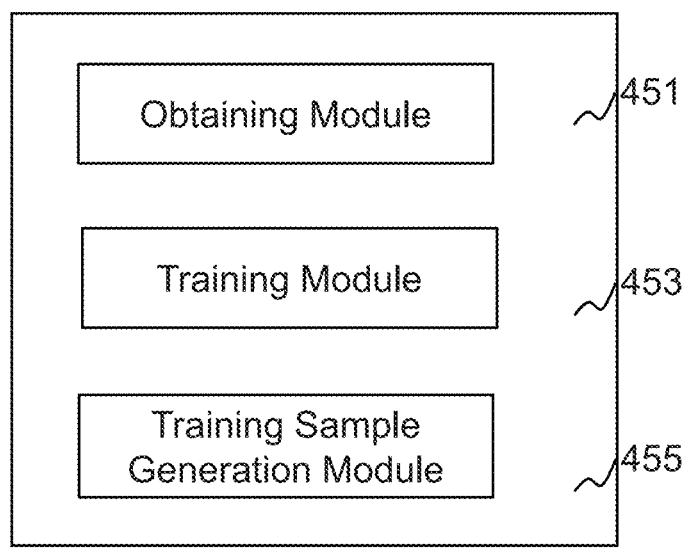

In some embodiments, the server 110 may include one or more processing devices 112 (e.g., the processing device 112-A as illustrated in FIG. 4A, the processing device 112-B as illustrated in FIG. 4B). The processing device 112 may process information and/or data relating to the service request to perform one or more functions described in the present disclosure. For example, the processing device 112-A may determine one or more POIs in response to a query inputted by a user. As another example, the processing device 112-B may determine a trained tagging model by training a preliminary tagging model using a plurality of training samples. In some embodiments, the processing device 112 may include one or more processing devices (e.g., single-core processing device(s) or multi-core processor(s)). Merely by way of example, the processing device 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components of the O2O service system 100 (e.g., the server 110, the requester terminal 130, the provider terminal 140, the storage device 150, and the navigation system 160) may send information and/or data to other component(s) in the O2O service system 100 via the network 120. For example, the server 110 may obtain/acquire service request from the requester terminal 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or Internet exchange points 120-1, 120-2, . . . , through which one or more components of the O2O service system 100 may be connected to the network 120 to exchange data and/or information.

In some embodiments, a requester may be a user of the requester terminal 130. In some embodiments, the user of the requester terminal 130 may be someone other than the requester. For example, a user A of the requester terminal 130 may use the requester terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requester" and "requester terminal" may be used interchangeably, and 'provider' and "provider terminal" may be used interchangeably. In some embodiments, the provider terminal may be associated with one or more providers (e.g., a night-shift service provider, or a day-shift service provider).

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc. In some embodiments, the requester terminal 130 may be a device with positioning technology for locating the position of the requester and/or the requester terminal 130.

The provider terminal 140 may include a plurality of provider terminals 140-1, 140-2, 140-n. In some embodiments, the provider terminal 140 may be a device that is similar to, or the same as the requester terminal 130. In some embodiments, the provider terminal 140 may be a device utilizing positioning technology for locating the position of a user of the provider terminal 140 (e.g., a service provider) and/or the provider terminal 140. In some embodiments, the requester terminal 130 and/or the provider terminal 140 may communicate with one or more other positioning devices to determine the position of the requester, the requester terminal 130, the provider, and/or the provider terminal 140. In some embodiments, the requester terminal 130 and/or the provider terminal 140 may send positioning information to the server 110.

The storage device 150 may store data and/or instructions. In some embodiments, the storage device 150 may store data obtained from the requester terminal 130 and/or the provider terminal 140, In some embodiments, the storage device 150 may store data and/or instructions that the server 110 may execute or use to perform exemplary methods described in the present disclosure. In some embodiments, storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the O2O service system 100 (e.g., the server 110, the requester terminal 130, the provider terminal 140). One or more components in the O2O service system 100 may access the data or instructions stored in the storage device 150 via the network 120. In some embodiments, the storage device 150 may be directly connected to or communicate with one or more components in the O2O service system 100 (e.g., the server 110, the requester terminal 130, the provider terminal 140). In some embodiments, the storage device 150 may be part of the server 110.

The navigation system 160 may determine information associated with an object, for example, one or more of the requester terminal 130, the provider terminal 140, etc. The information may include a location, an elevation, a velocity, or an acceleration of the object, or a current time. For example, the navigation system 160 may determine a current location of the requester terminal 130. In some embodiments, the navigation system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The location may be in the form of coordinates, such as, latitude coordinate and longitude coordinate, etc. The navigation system 160 may include one or more satellites, for example, a satellite 160-1, a satellite 160-2, and a satellite 160-3. The satellites 160-1 through 160-3 may determine the information mentioned above independently or jointly. The navigation system 160 may send the information mentioned above to the network 120, the requester terminal 130, or the provider terminal 140 via wireless connections.

In some embodiments, one or more components of the O2O service system 100 (e.g., the server 110, the requester terminal 130, the provider terminal 140) may have permission to access the storage device 150. In some embodiments, one or more components of the O2O service system 100 may read and/or modify information relating to the requester, provider, and/or the public when one or more conditions are met. For example, the server 110 may read and/or modify one or more users' information after a service is completed. As another example, the provider terminal 140 may access information relating to the requester when receiving a service request from the requester terminal 130, but the provider terminal 140 may not modify the relevant information of the requester.

One of ordinary skill in the art would understand that when an element (or component) of the O2O service system 100 performs, the element may perform through electrical signals and/or electromagnetic signals. For example, when a requester terminal 130 transmits out a service request to the server 110, a processor of the requester terminal 130 may generate an electrical signal encoding the request. The processor of the requester terminal 130 may then transmit the electrical signal to an output port. If the requester terminal 130 communicates with the server 110 via a wired network, the output port may be physically connected to a cable, which further may transmit the electrical signal to an input port of the server 110. If the requester terminal 130 communicates with the server 110 via a wireless network, the output port of the requester terminal 130 may be one or more antennas, which convert the electrical signal to electromagnetic signal. Similarly, a provider terminal 130 may receive an instruction and/or service request from the server 110 via electrical signal or electromagnet signals. Within an electronic device, such as the requester terminal 130, the provider terminal 140, and/or the server 110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
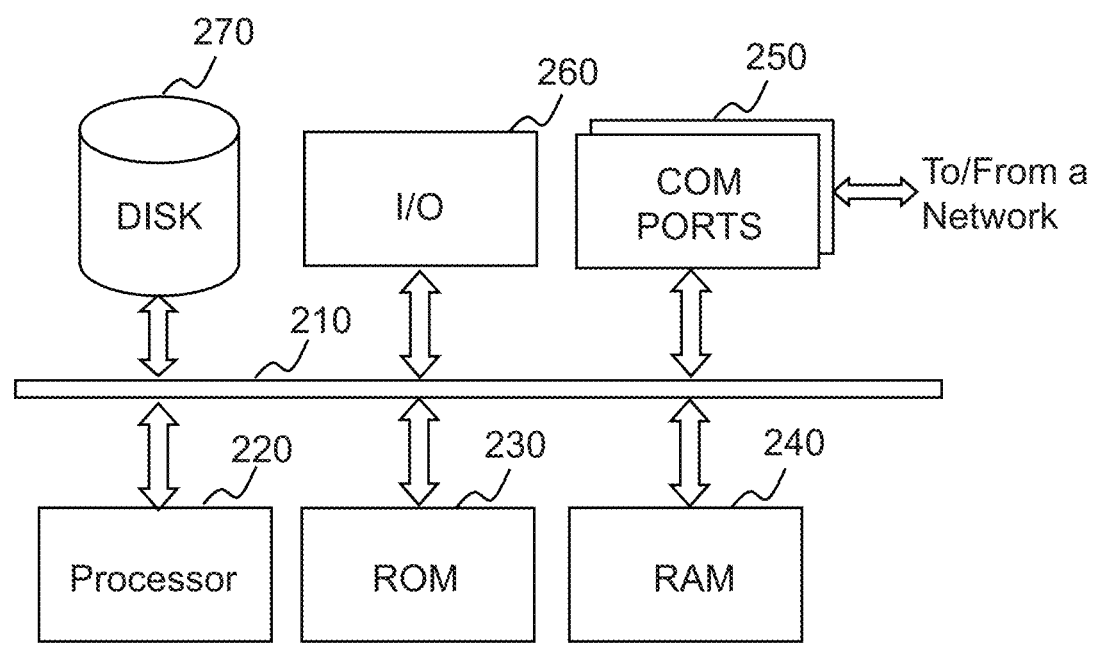
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 according to some embodiments of the present disclosure. In some embodiments, the server 110, the requester terminal 130, and/or the provider terminal 140 may be implemented on the computing device 200. For example, the processing device 112 of the server 110 may be implemented on the computing device 200 and configured to perform functions of the processing device 112 disclosed in this disclosure.

The computing device 200 may be a general purpose computer or a special purpose computer, both may be used to implement an O2O service system for the present disclosure. The computing device 200 may be used to implement any component of the O2O service system as described herein. For example, the processing device 112 may be implemented on the computing device, via its hardware, software program, firmware, or a combination thereof. Although only one such computer is shown, for convenience; the computer functions relating to the O2O service as described herein may be implemented in a distributed fashion on a number of similar platforms, to distribute the processing load.

The computing device 200, for example, may include a COM port 250 connected to and/or from a network connected thereto to facilitate data communications. The computing device 200 may also include a processor 220, in the form of one or more processors (or CPUs), for executing program instructions. The exemplary computing device may include an internal communication bus 210, different types of program storage units and data storage units (e.g., a disk 270, a read only memory (ROM) 230, a random access memory (RAM) 240), various data files applicable to computer processing and/or communication. The exemplary computing device may also include program instructions stored in the ROM 230, RAM 240, and/or other type of non-transitory storage medium to be executed by the processor 220, The method and/or process of the present disclosure may be implemented as the program instructions.

The computer device 200 also includes an I/O device 260 that may support the input and/or output of data flows between the computing device 200 and other components. The computing device 200 may also receive programs and data via the communication network.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
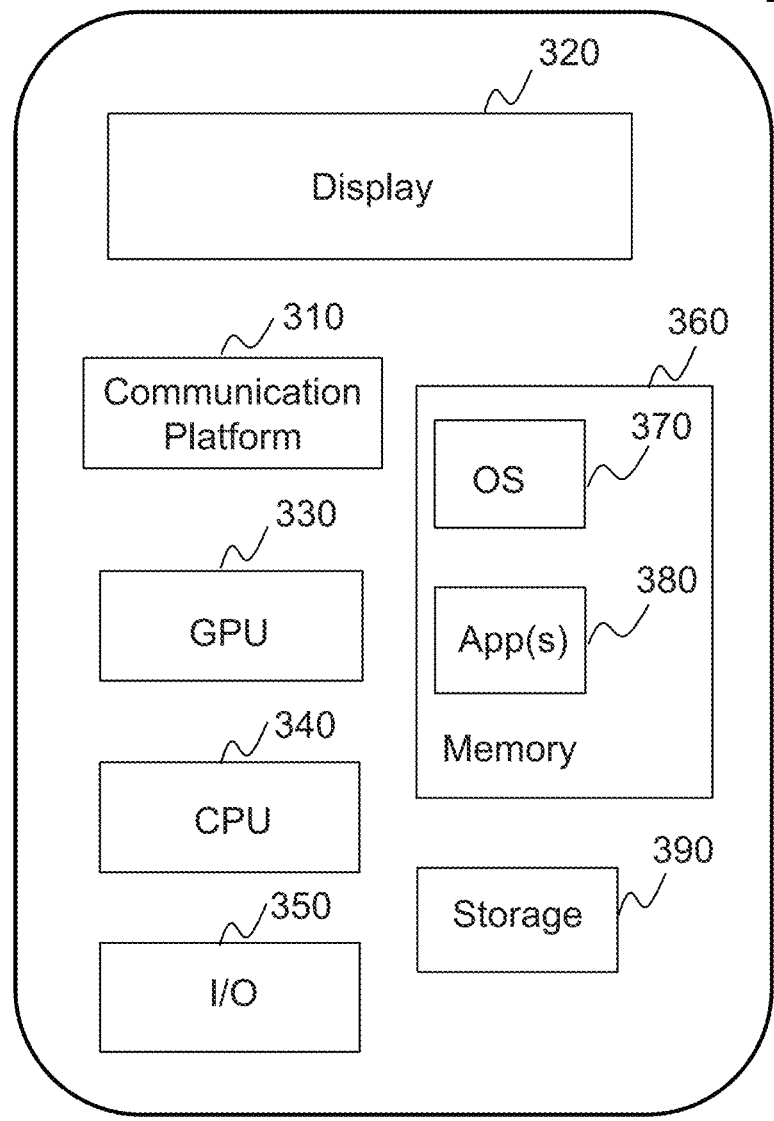
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, the mobile device 300 may be an exemplary embodiment corresponding to the requester terminal 130 or the provider terminal 140. As illustrated in FIG. 3, the mobile device 300 may include a communication platform 310, a display 320, a graphic processing unit (GPU) 330, a central processing unit (CPU) 340, an I/O 350, a memory 360, an operating system (OS) 370, a storage 390. In some embodiments, any other suitable component, including but not limited to a system bus or a controller (not shown), may also be included in the mobile device 300.

In some embodiments, an operating system 370 (e.g., iOS™, Android™ Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the O2O service system 100. User interactions with the information stream may be achieved via the I/O 350 and provided to the storage device 150, the server 110 and/or other components of the O2O service system 100.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

FIGS. 4A and 4B are block diagrams illustrating exemplary processing devices according to some embodiments of the present disclosure. In some embodiments, the processing device 112-A may be configured to process information and/or data to recall one or more POIs in response to a query. The processing device 112-B may be configured to train a preliminary tagging model using training samples to generate a trained tagging model for labeling a query. In some embodiments, the processing device 112-A and the processing device 112-B may respectively be implemented on a computing device 200 (e.g., the processor 220) as illustrated in FIG. 2 or a CPU 340 as illustrated in FIG. 3. For example, the processing device 112-A may be implemented on a CPU 340 of a user terminal, and the processing device 112-B may be implemented on a computing device 200. Alternatively, the processing device 112-A and the processing device 112-B may be implemented on a same computing device 200 or a same CPU 340. For example, the processing device 112-A and the processing device 112-B may be implemented on a same CPU 340 of a user terminal.

The processing device 112-A may include a receiving module 401, a term determination module 403, a labeling module 405, a POI determination module 407, and a display module 409.

The receiving module 401 may be configured to receive information and/or data from one or more components (e.g., the requester terminal 130, the provider terminal 140, the storage device 150) of the O2O service system 100. In some embodiments, the receiving module 401 may receive a query. The query may be inputted by a user via a terminal (e.g., the requester terminal 130, the provider terminal 140). In some embodiments, the query may include text information, voice information, or the like. In some embodiments, the query may be associated with a query location, such as a pickup location, a destination, etc. For example, the query may include one or more keywords relating to the pickup location or the destination (also referred to as relevant term), and at least one term that does not relate to the pickup location or the destination (also referred to as irrelevant term). The irrelevant term may cause failure to recall a POI or may recall undesired POI(s). Thus, before retrieving POI(s) from a database, the irrelevant term(s) may need to be identified and removed.

The term determination module 403 may be configured to determine one or more terms by processing a query (e.g., the received query). For example, the term determination module 403 may determine one or more terms by performing a word segmentation on the received query according to a word segmentation algorithm.

The labeling module 405 may be configured to label the one or more terms using a trained tagging model. In some embodiments, the trained tagging model may be generated by training a preliminary tagging model using a plurality of training samples. In some embodiments, the labeling module 405 may label each of the one or more terms with a first label (e.g., 0) or a second label (e.g., 1). Merely by way of example, the labeling module 405 may label an irrelevant term with the first label and a relevant term with the second label.

The POI determination module 407 may be configured to determine one or more POIs based on the labeled one or more terms. In some embodiments, the labeled one or more terms may include term(s) labeled with the first label and term(s) labeled with the second label. The POI determination module 407 may omit the term(s) labeled with the first label, and retrieve the POI(s) from a database based on the terms labeled with the second label.

The display module 409 may be configured to display the one or more POIs on a terminal (e.g., the requester terminal 130, the provider terminal 140). In some embodiments, the one or more POIs may be transmitted to a display of the terminal. The display module 409 may orderly display the one or more POIs on the display.

The processing device 112-B may include an obtaining module 451, a training module 453, and a training sample generation module 455.

The obtaining module 451 may be configured to obtain information and/or data from one or more components (e.g., the server 110, the requester terminal 130, the provider terminal 140, the storage device 150) of the O2O service system or from an external source via the network 120. In some embodiments, the obtaining module 451 may obtain a plurality of training samples. The plurality of training samples may correspond to a plurality of historical queries. Each of the historical queries may include one or more terms and one or more labels corresponding to the one or more terms. One or more terms of a historical query may be determined by performing a word segmentation on the historical query using a word segmentation algorithm. Each of the one or more terms may have a first label (e.g., 0) or a second label (e.g., 1).

The obtaining module 451 may also obtain a preliminary tagging model. The preliminary tagging model may include one or more feature layers. The one or more feature layers may be configured to extract a feature vector for each term of a historical query. In some embodiments, the preliminary tagging model may include a plurality of preliminary weights (or parameters). The one or more preliminary weights (or parameters) may be adjusted and/or updated during the training process of the preliminary tagging model.

The training module 453 may be configured to train the preliminary tagging model using the plurality of training samples to generate a trained tagging model. In some embodiments, the one or more terms of each training sample may be inputted into the preliminary tagging model to determine an actual output. The one or more labels corresponding to the one or more terms of the each training sample may be determined as a desired output. The training module 453 may compare the actual output with the desired output to determine a loss function. During the training of the preliminary tagging model, the training module 453 may adjust the plurality of preliminary weights (or parameters) to minimize the loss function. In some embodiments, the loss function and the preliminary weights (or parameters) may be updated iteratively in order to obtain a minimized loss function. The iteration to minimize the loss function may be repeated until a termination condition is satisfied. After the loss function is minimized, a trained tagging model may be determined according to the adjusted weights (or parameters).

The training sample generation module 455 may be configured to determine a training samples. In some embodiments, the training sample generation module 455 may obtain a historical query and a modified historical query. The historical query may include one or more terms that are determined by performing a word segmentation on the historical query. The historical query cannot recall a POI, and the modified historical query can recall one or more POIs. The modified historical query may be determined by a user via deleting at least one term in the historical query. The modified historical query may include one or more remaining terms. In some embodiments, the training sample generation module 455 may label the deleted at one term with a first label (e.g., 0) and the one or more remaining terms with a second label (e.g., 1). In some embodiments, the training sample generation module 455 may determine the one or more labeled terms as a training sample. That is, the training sample generation module 455 may determine the one or more terms and its corresponding one or more labels as the training sample.

The modules in the processing devices 112-A and 112-B may be connected to or communicate with each other via a wired connection or a wireless connection. The wired connection may include a metal cable, an optical cable; a hybrid cable, or the like; or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, two or more of the modules of a processing device 112 (e.g., the processing device 112-A, the processing device 112-B) may be combined into a single module. For example, the term determination module 403 and the labeling module 405 may be integrated into a single module configured to perform the functions thereof. In some embodiments, a processing device 112 (the processing device 112-A, and/or the processing device 112-B) may include one or more additional modules. For example, the processing device 112-A may include a storage module (not shown) configured to store data. In some embodiments, the processing device 112-A and the processing device 112-B may be integrated to a single processing device 112 to perform the functions thereof. The integrated processing device 112 may train a preliminary tagging model using training samples to generate a trained tagging model, and/or determine one or more POIs based on labeled terms that are labeled by the trained tagging model.

Figure 5:
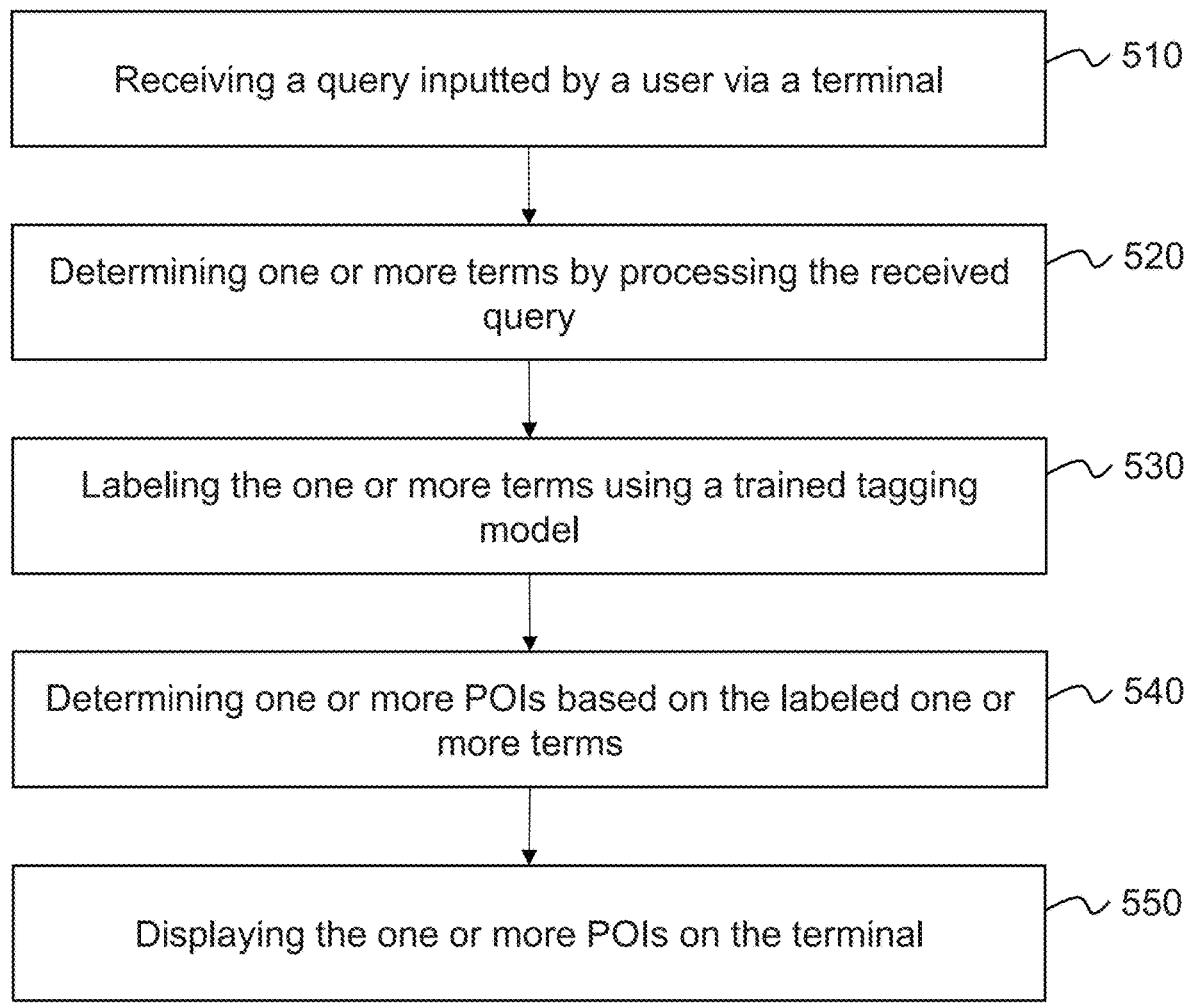
FIG. 5 is a flowchart illustrating an exemplary process for determining one or more POIs according to some embodiments of the present disclosure.

FIG. 5 is a flowchart illustrating an exemplary process for determining one or more POIs according to some embodiments of the present disclosure. At least a portion of process 500 may be implemented on the computing device 200 as illustrated in FIG. 2 or the mobile device 300 as illustrated in FIG. 3. In some embodiments, one or more operations of process 500 may be implemented in the O2O service system 100 as illustrated in FIG. 1. In some embodiments, one or more operations in the process 500 may be stored in the storage device 150 and/or the storage (e.g., the ROM 230, the RAM 240, etc.) as a form of instructions, and invoked and/or executed by the server 110 (e.g., the processing device 112-A in the server 110, or the processor 220 of the processing device 112-A in the server 110). In some embodiments, the instructions may be transmitted in a form of electronic current or electrical signals.

In 510, the processing device 112-A (e.g., the receiving module 401) may receive a query. The query may be inputted by a user via a terminal (e.g., the requester terminal 130, the provider terminal 140). In some embodiments, the query may be text information inputted via a character input device (e.g., a keyboard, a touchscreen). Alternatively, the query may include voice information inputted via a microphone. The processing device 112-A may then transform the voice information into text information using a speech recognition technique, for example, a hidden Markov model (HMM) algorithm, an artificial neural network (ANN) algorithm, or the like.

In some embodiments, the query may be associated with a query location, such as a pickup location, a destination, etc. For example, the query may include information associated with a name of the pickup location, a name of the destination. The name of the pickup location and/or the destination may include a name of a community (e.g., a home address of the user), a name of a company (e.g., a work address of the user), a name of a market, a name of a hospital, a name of a bus station, a name of a metro station, a name of a train station, a name of a hotel, a name of food plaza, a name of a scenic area, a name of a street, or the like.

In some embodiments, the query may include one or more keywords relating to the pickup location or the destination (also referred to as herein relevant term). One or more points of interest (POIs) may be recalled according to the one or more keywords. Alternatively, the query may include at least one term that does not relate to the pickup location or the destination (also referred to as herein irrelevant term), which may cause failure to recall a POI or may recall undesired POI(s). Merely by way of example, a POI that a user requires to recall (also referred to as desired POI) may be "Jiangsu Province Suzhou City Xuesen Road No. 9". In some embodiments, if a query inputted by the user is "Xuesen Road No. 9", the desired POI may be recalled according to the query "Xuesen Road No. 9". Alternatively, if a query inputted by the user is "Xuesen Road have works No. 9" and the query includes irrelevant terms "have" and "works", the desired POI cannot be recalled due to the irrelevant terms. Thus, before retrieving POI(s) from a database, the irrelevant term(s) may need to be identified and removed.

In 520, the processing device 112-A (e.g., the term determination module 403) may determine one or more terms by processing the received query. In some embodiments, the processing device 112-A may determine the one or more terms by performing a word segmentation on the received query according to a word segmentation algorithm. Exemplary word segmentation algorithm may include a character matching-based word segmentation algorithm (e.g., a maximum matching algorithm, an omi-word segmentation algorithm, a statistical language model algorithm), a sequence annotation-based word segmentation algorithm (e.g., POS tagging), a deep learning-based word segmentation algorithm (e.g., a hidden Markov model algorithm), or the like.

Merely by way of example, if the query is "Xuesen Road have works No. 9", the processing device 112-A may perform a word segmentation on the query to determine four terms, i.e., "Xuesen Road," "have," "works," "No. 9".

In 530, the processing device 112-A (e.g., the labeling module 405) may label the one or more terms using a trained tagging model. In some embodiments, the trained tagging model may be generated by training a preliminary tagging model using a plurality of training samples. Details regarding the generation of the trained tagging model may be found elsewhere in the present disclosure (e.g., FIG. 6 and the descriptions thereof).

Figure 8:
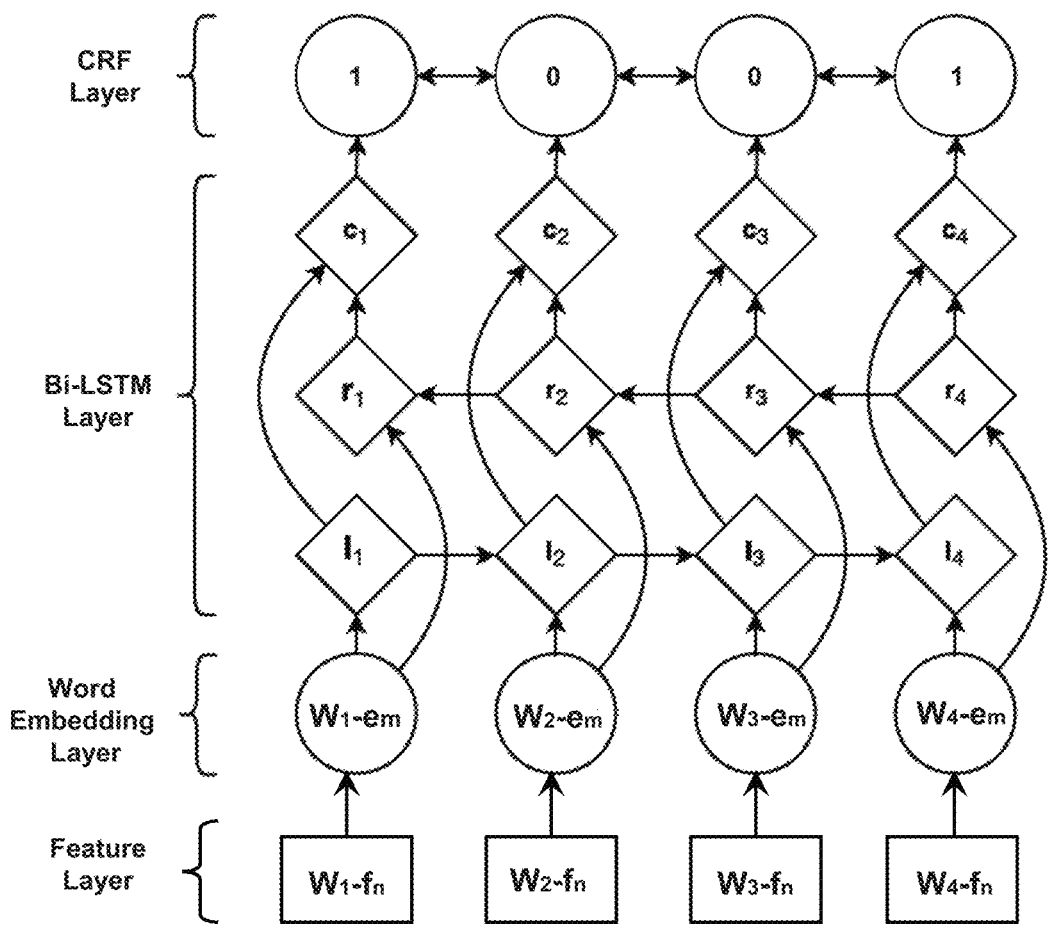
FIG. 8 is a schematic diagram illustrating an exemplary tagging model according to some embodiments of the present disclosure.

Merely by way of example, as shown in FIG. 8, the trained tagging model may include one or more feature layers, a word embedding layer, a Bi_LSTM layer, a CRF layer, etc. In some embodiments, the one or more feature layers may be configured to extract a feature vector for each of the one or more terms. The feature vector of each term may be used to enrich feature information of the each term. The one or more terms may be inputted into the trained tagging model, and one or more labels corresponding to the one or more terms may be outputted from the trained tagging model.

In some embodiments, the processing device 112-A may label each of the one or more terms with a first label (e.g., 0) or a second label (e.g., 1). In some embodiments, an irrelevant term may be labeled with the first label, and a relevant term may be labeled with the second label. For example, the processing device 112-A may label "have" and "works" with the first label and/or "Xuesen Road" and No. 9" with the second label.

In 540, the processing device 112-A (e.g., the POI determination module 407) may determine one or more POIs based on the labeled one or more terms. In some embodiments, the determined POI(s) may include one or more names associated with the pickup location and/or the destination.

In some embodiments, the labeled one or more terms may include term(s) labeled with the first label and term(s) labeled with the second label. The processing device 112-A may omit the term(s) labeled with the first label, and retrieve the POI(s) from a database based on the terms labeled with the second label. In some embodiments, the database may be a map database including a Google map, an Amap, a Baidu map, or the like. Merely by way of example, the processing device 112-A may omit "have" and "works" with the first label, and retrieve one or more POIs from the database based on "Xuesen Road" and "No. 9" with the second label.

In 550, the processing device 112-A (e.g., the display module 409) may display the one or more POIs on the terminal (e.g., the requester terminal 130, the provider terminal 140). In some embodiments, the processing device 112-A may transmit the one or more POIs to a display (e.g., the display 320) of the terminal. The one or more POIs may be displayed and/or ranked on the display based on, for example, a relevancy with the query. The user may click a POI from the one or more POIs as a desired POI.

In the present disclosure, if a query inputted by a user includes irrelevant term(s) (i.e., term(s) that cannot recall a POI), the query may not be modified by the user. The processing device 112-A may automatically identify the irrelevant term(s) using a trained tagging model, and/or omit the irrelevant term(s) when performing a retrieval in the map database, which may shorten the time of recalling the POI(s) and improve a recall rate.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, if a query does not include irrelevant term(s), operation 530 may be omitted. In 540, one or more POIs may be determined based on the terms determined in 520. As another example, a storing step may be added. The storing step may store the one or more labeled terms in a storage device (e.g., the storage device 150), and the one or more labeled terms may be used as a training sample for updating the trained tagging model.

Figure 6:
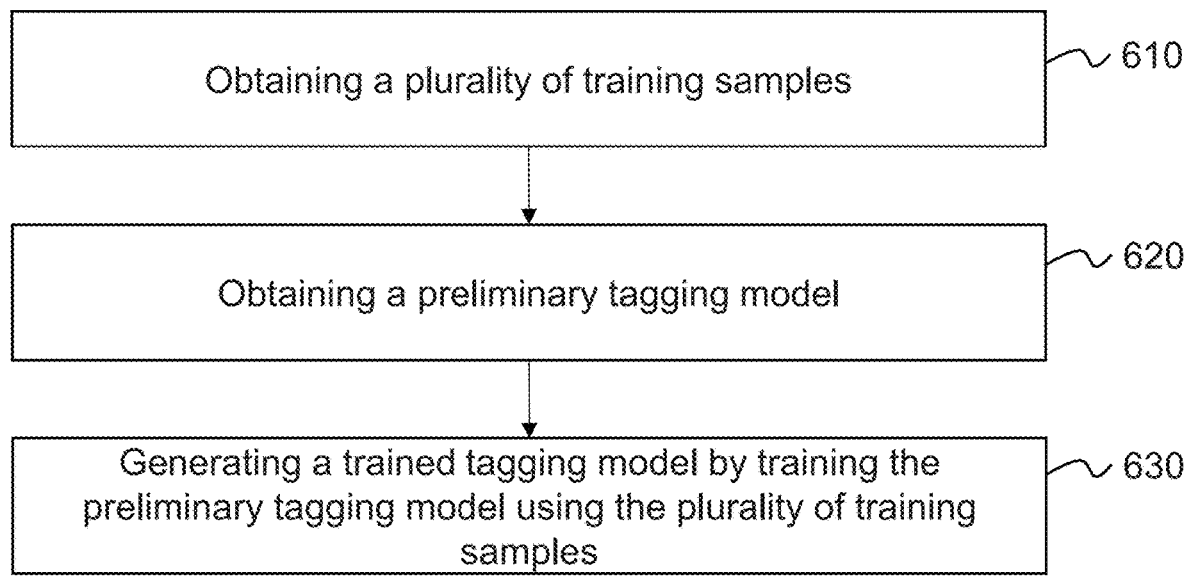
FIG. 6 is a flowchart illustrating an exemplary process for determining a trained tagging model according to some embodiments of the present disclosure.

FIG. 6 is a flowchart illustrating an exemplary process for determining a trained tagging model according to some embodiments of the present disclosure. At least a portion of process 600 may be implemented on the computing device 200 as illustrated in FIG. 2 or the mobile device 300 as illustrated in FIG. 3. In some embodiments, one or more operations of process 600 may be implemented in the O2O service system 100 as illustrated in FIG. 1. In some embodiments, one or more operations in the process 600 may be stored in the storage device 150 and/or the storage (e.g., the ROM 230, the RAM 240, etc.) as a form of instructions, and invoked and/or executed by the server 110 (e.g., the processing device 112-B in the server 110, or the processor 220 of the processing device 112-B in the server 110). In some embodiments, the instructions may be transmitted in a form of electronic current or electrical signals.

In 610, the processing device 112-B (e.g., the obtaining module 451) may obtain a plurality of training samples. The plurality of training samples may correspond to a plurality of historical queries. Each of the historical queries may include one or more terms and one or more labels corresponding to the one or more terms. One or more terms of a historical query may be determined by performing a word segmentation on the historical query using a word segmentation algorithm. Exemplary word segmentation algorithms are described elsewhere in the present disclosure (e.g., operation 520 of the process 500). Each of the one or more terms may have a first label (e.g., 0) or a second label (e.g., 1). In some embodiments, irrelevant term(s) (e.g., term(s) not relating to a pickup location or a destination) may be assigned with the first label, and relevant term(s) (e.g., term(s) relating to the pickup location or the destination) may be assigned with the second label. Merely by way of example, for a historical query "Yinsha Road have things No. 17", irrelevant terms "have" and "things" may be assigned with the first label, and relevant terms "Yinsha Road" and "No, 17" may be assigned with the second label. In some embodiments, the plurality of training samples may be determined according to process 700, and the relevant descriptions are not repeated herein.

In some embodiments, the processing device 112-B may obtain the plurality of training samples from one or more components of the O2O service system 100, for example, the server 110, a terminal (e.g., the requester terminal 130, the provider terminal 140), a storage device (e.g., the storage device 150). Alternatively or additionally, the processing device 112-B may obtain the plurality of training samples from an external source via the network 120.

In 620, the processing device 112-B (e.g., the obtaining module 451) may obtain a preliminary tagging model. In some embodiments, the preliminary tagging model may be based on a Bi_LSTM_CRF model, a LSTM_CRF model, a LSTM model, a CRF model, or the like. Specifically, compared with the Bi_LSTM_CRF model, the LSTM_CRF model, the LSTM model, or the CRF model, the preliminary tagging model may include one or more feature layers. The one or more feature layers may be configured to extract a feature vector for each term of a historical query. Each of the one or more feature layers may correspond to a feature attribute. The feature attribute may include a location attribute, a city attribute, or the like, or any combination thereof. In some embodiments, the preliminary tagging model may include a plurality of preliminary weights (or parameters). For example, each of the one or more feature layers (e.g., each feature attribute) may correspond to a preliminary weight. As another example, other layers of the preliminary tagging model (e.g., the Bi_LSTM layer as illustrated in FIG. 8) may also have one or more preliminary weights. In some embodiments, the plurality of preliminary weights may be preset by the O2O service system 100, or by a user. The one or more preliminary weights (or parameters) may be adjusted and/or updated during the training process of the preliminary tagging model.

In some embodiments, the processing device 112-B may obtain the preliminary tagging model from one or more components of the O2O service system 100, for example, the server 110, a terminal (e.g., the requester terminal 130, the provider terminal 140), a storage device (e.g., the storage device 150). Alternatively or additionally, the processing device 112-B may obtain the preliminary tagging model from an external source via the network 120.

In 630, the processing device 112-B (e.g., the training module 453) may generate a trained tagging model by training the preliminary tagging model using the plurality of training samples.

In some embodiments, the one or more terms of each training sample may be inputted into the preliminary tagging model to determine an actual output (e.g., a label sequence described in FIG. 8). The one or more labels corresponding to the one or more terms of the each training sample may be determined as a desired output. The processing device 112-B may compare the actual output with the desired output to determine a loss function. The loss function may measure a difference between the actual output and the desired output. During the training of the preliminary tagging model, the processing device 112-B may adjust the plurality of preliminary weights (or parameters) to minimize the loss function. In some embodiments, the loss function and the preliminary weights (or parameters) may be updated iteratively in order to obtain a minimized loss function. The iteration to minimize the loss function may be repeated until a termination condition is satisfied. An exemplary termination condition is that an updated loss function with the updated weights (or parameters) obtained in an iteration is less than a predetermined threshold. The predetermined threshold may be set manually or determined based on various factors including, such as the accuracy of the trained tagging model, etc.

After the loss function is minimized, a trained tagging model may be determined according to the adjusted weights (or parameters), In some embodiments, the trained tagging model may be stored in a storage device in the O2O service system 100, such as the storage device 150, the ROM 230, the RAM 240, or the like.

Generally, a (historical) query may only include several terms, and context information may be unavailable. In the present disclosure, the tagging model may add one or more feature layers configured to extract a feature vector for each term of a (historical) query. The feature vector of the each term can enrich feature information of the each term, which may facilitate the recognition of the each term.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
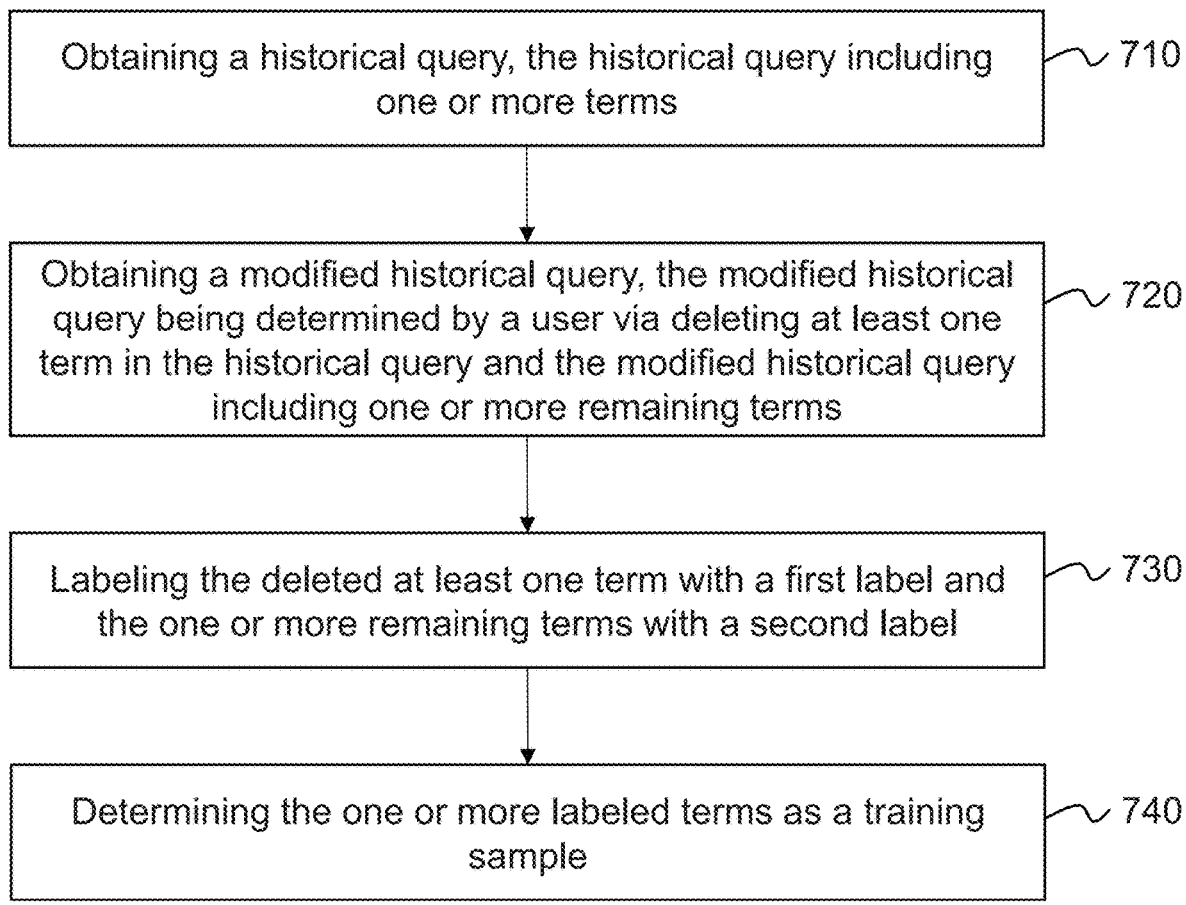
FIG. 7 is a flowchart illustrating an exemplary process for determining a training sample according to some embodiments of the present disclosure.

FIG. 7 is a flowchart illustrating an exemplary process for determining a training sample according to some embodiments of the present disclosure. At least a portion of process 700 may be implemented on the computing device 200 as illustrated in FIG. 2 or the mobile device 300 as illustrated in FIG. 3. In some embodiments, one or more operations of process 700 may be implemented in the O2O service system 100 as illustrated in FIG. 1. In some embodiments, one or more operations in the process 700 may be stored in the storage device 150 and/or the storage (e.g., the ROM 230, the RAM 240, etc.) as a form of instructions, and invoked and/or executed by the server 110 (e.g., the processing device 112-B in the server 110, or the processor 220 of the processing device 112-B in the server 110). In some embodiments, the instructions may be transmitted in a form of electronic current or electrical signals. In some embodiments, the training sample(s) as illustrated in operation 610 of the process 600 may be generated according to the process 700.

In 710, the processing device 112-B (e.g., the training sample generation module 455) may obtain a historical sample query. The historical query cannot recall a POI. The historical query may include one or more terms that are determined by performing a word segmentation on the historical query. Merely by way of example, the historical query may be "Yinsha Road have things No. 17" that cannot recall a POI. The historical query may be segmented into four terms, that is, "Yinsha Road," "have," "things," and "No. 17".

In some embodiments, the processing device 112-B may obtain the historical query from one or more components of the O2O service system 100, for example, the server 110, a terminal (e.g., the requester terminal 130, the provider terminal 140), a storage device (e.g., the storage device 150), or the like. Alternatively or additionally, the processing device 112-B may obtain the historical query from an external source via the network 120.

In 720, the processing device 112-B (e.g., the training sample generation module 455) may obtain a modified historical query. The modified historical query can recall one or more POIs. The modified historical query may be determined by a user via deleting at least one term in the historical query. The modified historical query may include one or more remaining terms. Merely by way of example, the historical query may include terms "Yinsha Road," "have," "things" and "No. 17". The terms "have" and "things" in the historical query may be deleted by the user. The modified historical query may include remaining terms "Yinsha Road" and "No. 17", which may recall one or more POIs. In some embodiments, the deleted term(s) (e.g., "have," "things") may also be referred to as irrelevant term(s), and the remaining terms) (e.g., "Yinsha Road," "No. 17") may also be referred to as relevant term(s).

In some embodiments, the processing device 112-B may obtain the modified historical query from one or more components of the O2O service system 100, for example, the server 110, a terminal (e.g., the requester terminal 130, the provider terminal 140), a storage device (e.g., the storage device 150), or the like. Alternatively or additionally, the processing device 112-B may obtain the modified historical query from an external source via the network 120.

In some embodiments, the processing device 112-B may obtain the historical query and/or the modified historical query from a session stored in a storage device (e.g., the storage device 150, the ROM 230, the RAM 240). The session may include one or more use's operations when searching a desired POI, including inputting the historical query, modifying the historical query, and/or clicking the desired POI. Merely by way of example, an exemplary session may be shown in Table 1. The processing device 112-B may determine "Yinsha Road have things No. 17" as a historical query, and "Yinsha Road No. 17" as a modified historical query. The processing device 112-B may then perform a word segmentation on the historical query and/or the modified historical query to determine one or more terms.

TABLE 1

An Exemplary Session

| Query | Time | Click |
|---|---|---|
| Yinsha Road have things No. 17 | Apr. 30, 2018 13:52:06 | / |
| Yinsha Road have No. 17 | Apr. 30, 2018 13:52:11 | / |
| Yinsha Road No. 17 | Apr. 30, 2018 13:52:12 | Guangdong Province Dongguan City Changan Town Yinsha Road No. 17 |

In 730, the processing device 112-B (e.g., the training sample generation module 455) may label the deleted at least one term with a first label (e.g., 0) and the one or more remaining terms with a second label (e.g., 1). That is to say, the processing device 112-B may label the irrelevant term(s) with the first label and the relevant term(s) with the second term(s). Merely by way of example, the processing device 112-B may label the terms "have" and "things" with the first label and the terms "Yinsha Road" and "No. 17" with the second label.

In 740, the processing device 112-B (e.g., the training sample generation module 455) may determine the one or more labeled terms as a training sample. The processing device 112-B may determine the one or more terms and its corresponding one or more labels as the training sample. Merely by way of example, the processing device 112-B may determine the terms "Yinsha Road," "have," "things," "No. 17" and the corresponding labels "second label," "first label," "first label," "second label" as the training sample.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 710 and 720 may be performed simultaneously. As another example, operation 720 may be performed before operation 710. In some embodiments, the processing device 120-B may repeat the process 700 to determine a plurality of training samples.

FIG. 8 is a schematic diagram illustrating an exemplary tagging model according to some embodiments of the present disclosure. In some embodiments, the tagging model may be a preliminary tagging model that needs to be trained. Alternatively, the tagging model may be a trained tagging model. As shown in FIG. 8, the tagging model is based on a Bi_LSTM_CRF model. The tagging model includes one or more feature layers, a word embedding layers, a Bi_LSTM (long short-term memory) layer, a CRF (conditional random field) layer.

The one or more feature layers may be configured to extract a feature vector for each of one or more terms of a query (e.g., "Yinsha Road," "have," "things," "No. 17"). The feature vector of each term may be used to enrich feature information of the each term. Each of the one or more feature layers may correspond to a feature attribute. The feature attribute in each feature layer may have a weight. The feature attribute may include a location attribute, a city attribute, or the like, or any combination thereof. In some embodiments, the input of the one or more feature layers may include the one or more terms of the query (i.e., "Yinsha Road," "have," "things," "No. 17"), and the output of the one or more feature layers may include one or more feature vectors corresponding to the one or more terms (e.g., $W_1$-$f_n$, $W_2$-$f_n$, $W_3$-$f_n$, $W_4$-$f_n$ as illustrated in FIG. 8, wherein n refers to a dimension of the feature vectors).

The word embedding layer may be configured to extract semantic information of each of the one or more terms of the query. Specifically, the word embedding layer may map each of the one or more terms of the query into a multi-dimensional vector (also referred to as a word embedding vector), which may also be referred to as word representation. In some embodiments, the word embedding layer may determine the word embedding vector for each of the one or more terms based on a corpus including pretrained word embeddings. In some embodiments, the input of the word embedding layer may include the one or more terms (i.e., "Yinsha Road," "have," "things," "No. 17"), and the output of the word embedding layer may include one or more word embedding vectors corresponding to the one or more terms (e.g., $W_1$-$e_m$, $W_2$-$e_m$, $W_3$-$e_m$, $W_4$-$e_m$ as illustrated in FIG. 8, wherein m refers to a dimension of the word embedding vectors). In some embodiments, the word embedding layer may determine a 50-dimensional word embedding vector for each of the one or more terms.

In some embodiments, the feature vector and the word embedding vector of each of the one or more terms may be combined to determine a combined vector for each of the one or more terms. The combined vector of each of the one or more terms may be inputted into the Bi_LSTM layer. The Bi_LSTM layer may be configured to determine a probability of label for each of the one or more terms. The Bi_LSTM layer may include a forward LSTM, a backward LSTM and an output layer. In some embodiments, the Bi_LSTM layer may efficiently make use of past features (via forward states) and future features (via backward states). For example, as shown in FIG. 8, $l_i$ (e.g., $l_1$, $l_2$, $l_3$, $l_4$) represents term at location $r_i$ and its left context, $r_i$ (e.g., $r_1$, $r_2$, $r_3$, $r_4$) represents term at location i and its right context, and $c_i$ (e.g., $C_1$, $C_3$, $C_3$, $C_4$) represents a representation of the term at location i in its context by concatenating $l_i$ and $r_i$. In some embodiments, the output of the Bi_LSTM layer may include a probability of each term labeling a first label and/or labeling a second label, which may be inputted into the CRF layer.

The CRF layer may be configured to determine a predicted label for each of the one or more terms of the query. In some embodiments, the CRF layer may add some constrains to the predicted label(s) to ensure the predicted label(s) are valid. In some embodiments, the CRF layer may be used to determine one or more label sequences corresponding to the one or more terms of the query A label sequence may refer to a sequence of labels of the one or more terms. For example, the label sequences of the terms "Yinsha Road," "have," "things," "No. 17" may include "1/1/1/1," "1/1/1/0," "1/1/0/1," "1/1/0/0," "1/0/1/1," "1/0/1/0," "1/0/0/1," "1/0/0/0," "0/1/1/1," "0/1/1/0," "0/1/0/1," "0/1/0/0," "0/0/1/1," "0/0/1/0," "0/0/0/1," "0/0/0/0". In some embodiments, the CRF layer may also be used to determine a score for each of the one or more label sequences. Merely by way of example, a score corresponding to a label sequence may be determined according to Equation (1) as below:

$$S(X, y) = \sum_{i=1}^{n} A_{y_i, y_{i+1}} + \sum_{i=1}^{n} P_{i, y_i}, \tag{1}$$

wherein X refers to the query; y refers to a label sequence of the query; S(X,y) refers to a score corresponding to the label sequence y; i refers to a location of a term in the query; n refers to the number of terms in the query; $y_i$ refers to a label (e.g., the first label or the second label) of a term at location i; $A_{yi,yi+_1}$ refers to a transition score of from the first label (e.g., 0) to the second label (e.g., 1) and/or from the second label to the first label; and $P_{i,y_i}$ refers to a emission score of a term at location i being the first label and/or being the second label.

Therefore, one or more scores corresponding to the one or more label sequences may be determined according to Equation (1). A label sequence with the largest score (i.e., max S(X,y)) may be determined as the output of the CRF layer.

In some embodiments, the tagging model may be a trained tagging model. One or more labels corresponding to one or more terms of a query may be determined according to the output of the CRF layer of the trained tagging model. Merely by way of example, for a query having four terms "Xuesen Road," "have," "works," "No. 9", the four terms may be inputted into the trained tagging model, and a label sequence with the largest score (e.g., "1/0/0/1") may be outputted from the trained tagging model. Therefore, four labels corresponding to the four terms may be "1," "0," "0," "1".

In some embodiments, the tagging model may be a preliminary tagging model that needs to be trained. A plurality of training samples (e.g., training samples determined according to process 700) may be used to train the preliminary tagging model. During the training process, a plurality of preliminary weights (or parameters) in the preliminary tagging model may be updated and/or adjusted. Details regarding the training of the preliminary tagging model may be found elsewhere in the present disclosure (e.g., process 600 and the descriptions thereof).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for training a tagging model, comprising:
at least one storage device including a set of instructions for determining a trained tagging model for labeling a query;
at least one processor in communication with the at least one storage device, wherein when executing the set of instructions, the at least one processor is directed to:
obtain a plurality of training samples, the plurality of training samples corresponding to a plurality of historical queries, each of the plurality of historical queries including one or more terms and one or more labels corresponding to the one or more terms, wherein each of the plurality of historical queries does not recall a point of interest (POI) and is inputted by a user, and wherein to obtain one of the plurality of training samples corresponding to one of the plurality of historical queries, the at least one processor is directed to;
   obtain a modified historical query that recalls one or more POIs, the modified historical query being determined by the user via deleting at least one term in the historical query, and the modified historical query including one or more remaining terms;
   label the deleted at least one term with a first label and the one or more remaining terms with a second label; and
   determine the one or more labeled terms as the training sample; and
generate a trained tagging model by training a preliminary tagging model using the plurality of training samples, wherein the preliminary tagging model includes one or more feature layers configured to extract a feature vector for each term of the one or more terms.

2. The system of claim 1, wherein the at least one processor is further directed to:
perform a word segmentation on the historical query to determine the one or more terms.

3. The system of claim 1, wherein each of the one or more feature layers corresponds to a feature attribute, the feature attribute having a weight.

4. The system of claim 3, wherein the feature attribute includes at least one of a location attribute and a city attribute.

5. The system of claim 1, wherein the preliminary tagging model includes a word embedding layer configured to determine a word embedding vector for the each term, and the at least one processor is further directed to:
combine the feature vector of the each term and the word embedding vector of the each term to determine a combined vector of the each term.

6. The system of claim 1, wherein the preliminary tagging model is based on at least one of a Bi_LSTM_CRF model, a LSTM_CRF model, a LSTM model, or a CRF model.

7. The system of claim 1, wherein the at least one processor is further directed to:
receive a query inputted by a user via a terminal;
determine one or more terms by processing the received query;
label each of the one or more terms with the first label or the second label using the trained tagging model;
determine one or more POIs based on the labeled one or more terms by retrieving the one or more POIs from a database based on terms of the one or more terms labeled with the second label; and
display the one or more POIs on the terminal.

8. The system of claim 7, wherein the query includes text information or voice information.

9. The system of claim 7, wherein to determine one or more terms, the at least one processor is further directed to:
perform a word segmentation on the received query to determine the one or more terms.

10. A method for training a tagging model, implemented on a computing device having at least one processor, at least one computer-readable storage medium, and a communication platform connected to a network, the method comprising:
   obtaining a plurality of training samples, the plurality of training samples corresponding to a plurality of historical queries, each of the plurality of historical queries including one or more terms and one or more labels corresponding to the one or more terms, wherein each of the plurality of historical queries does not recall a point of interest (POI) and is inputted by a user, and the obtaining one of the plurality of training samples corresponding to one of the plurality of historical queries includes:
      obtaining a modified historical query that recalls one or more POIs, the modified historical query being determined by the user via deleting at least one term in the historical query, and the modified historical query including one or more remaining terms;
      labeling the deleted at least one term with a first label and the one or more remaining terms with a second label; and
      determining the one or more labeled terms as the training sample; and
   generating a trained tagging model by training a preliminary tagging model using the plurality of training samples, wherein the preliminary tagging model includes one or more feature layers configured to extract a feature vector for each term of the one or more terms.

11. The method of claim 10, further comprising:
performing a word segmentation on the historical query to determine the one or more terms.

12. The method of claim 10, wherein each of the one or more feature layers corresponds to a feature attribute, the feature attribute having a weight.

13. The method of claim 12, wherein the feature attribute includes at least one of a location attribute and a city attribute.

14. The method of claim 10, wherein the preliminary tagging model includes a word embedding layer configured to determine a word embedding vector for the each term, and the method further comprises:
combining the feature vector of the each term and the word embedding vector of the each term to determine a combined vector of the each term.

15. The method of claim 10, wherein the preliminary tagging model is based on at least one of a Bi_LSTM_CRF model, a LS_CRF model, a LSTM model, or a CRF model.

* * * * *